Patented Aug. 22, 1950

2,519,931

UNITED STATES PATENT OFFICE 2,519,931

TENDERIZING MEATS

Harry L. Roschen, Maywood, and Bernard J. Ortscheid and John M. Ramsbottom, Chicago, Ill., assignors, by mesne assignments, to Swift & Company, a corporation of Illinois No Drawing. Application February 8, 1947, Serial No. 727,308

7 Claims. (Cl. 99—107)

This invention relates in general to a process of treating edible animal carcasses and cuts thereof and more particularly to a process of accelerating the rigor mortis transition period in the said carcasses and cuts thereof.

It has been customary in the commercial processing of carcasses and cuts thereof to remove the skin from the carcasses relatively soon after slaughtering and to transfer the cleaned carcasses to a cooler wherein the temperature may be lowered to around freezing and sometimes substantially below freezing. During this storage period which may extend from two to three weeks, the carcass "ages" or becomes more tender and acceptable to the trade.

It has recently been discovered that the aging of animal carcasses and cuts thereof does not begin to have any tenderizing effect until after the carcasses have passed through the condition commonly known as rigor mortis. Under normal conditions of handling rigor mortis changes are not complete until 16 to 24 hours after slaughtering. Moreover, during the prolonged period of rigor mortis there is evidence of an apparent toughening of the meat which must be overcome during the subsequent aging process.

Because this aging process is very time consuming, numerous methods of treating carcasses have been devised wherein the skinned carcass either in the frozen or chilled condition is subjected to internal or external heat until the desired result is obtained. These processes, however, are objectionable in certain respects because they either employ elevated temperatures which cause unwanted color changes to take place, or they employ temperatures which are so low that they fail to accelerate the aging process to any appreciable degree.

An object of the present invention is to accelerate the rigor mortis transition period in the carcasses and cuts thereof whereby the aging period is materially shortened.

Another object of the invention is to accelerate the period of rigor mortis without causing any appreciable color change in the meat.

A further object of the invention is to treat animal carcasses so that the rigor mortis transition period transpires in a very short time without employing special heating or handling equipment.

An additional object of the invention is to maintain the carcasses under such conditions that the meat may be subsequently tenderized in a relatively hort time and by normal refrigeration methods.

Still other objects of this invention will become apparent from the description and claims to follow.

According to the present invention animal carcasses of beef, lamb, veal, or the like may be brought through the condition commonly known as rigor mortis in a relatively short time by maintaining the freshly slaughtered carcass at the normal body temperature of the animal for a few hours immediately after slaughtering said animal and before any of the normal body heat of the animal dissipates.

In the preferred embodiment of the invention the whole beef carcass is skinned on the killing floor and immediately placed in a chamber having approximately a 90 per cent relative humidity and held at a temperature of approximately 98.6° F. After the carcass has been maintained at the said temperature for approximately 4 to 5 hours, rigor mortis is complete and the carcass is then chilled to storage temperatures, approximately 34° F.

According to another modification of the invention a freshly skinned lamb carcass is wrapped with a brine moistened cloth before any appreciable amount of the heat present has dissipated and immediately placed in the treating chamber maintained at a temperature of approximately 100° F. After approximately 3 hours in said chamber rigor mortis is substantially complete and the carcass is chilled to around 34° F. for normal holding and aging.

As another example of the invention a round freshly dressed veal carcass with the hide on is placed very soon after the slaughtering in a treating chamber having a temperature of approximately 99° F. After a period of approximately 4 hours in said chamber rigor mortis is substantially complete and the carcass is chilled to normal holding and aging temperatures, approximately 34° F.

In each of the foregoing examples it will be observed that the temperature at which the treating chamber is maintained is substantially the normal body temperature of the animal. These body temperatures may vary slightly but generally are between 98° F. and 100° F. It is important that the temperature of the treating chamber does not rise materially above the normal body temperature of the animal. If temperatures materially above the body temperature of the animal are employed in the treating chamber objectionable color changes in the meat are observed. Likewise in each of the above examples it will be observed that the animal carcass is processed immediately or soon after slaughtering and before there is any appreciable drop in the temperature of the carcass. By processing in the foregoing manner the rigor mortis transition period is greatly accelerated and the toughening of the meat which generally accompanies rigor mortis is substantially avoided. Thus the subsequent aging period may be greatly shortened when this invention is practiced.

While it is unnecessary to maintain the humidity of the treating chamber at a high degree in every instance, it is preferable to maintain the relative humidity in the chamber at around 90 per cent in order to minimize drying and shrinking losses. It should be emphasized, however, that a high degree of humidity is not essential to the process since highly satisfactory results are obtained without employing a high degree of humidity.

In conjunction with the foregoing studies it was observed that the acidity of the meat, as measured by its pH, changes gradually after slaughtering. Under normal conditions, the pH value one or two hours after slaughtering is about 6.5 to 6.6, whereas the final pH value after rigor mortis is complete falls between 5.4 and 5.8 and remains substantially constant throughout the normal holding and aging of the meat.

The data presented in Table I represents the changes in pH values which were observed when a number of longissimus dorsi muscles from the ribs and loins of several freshly slaughtered beef carcasses were held at approximately 98° F. for the specified times:

*Table I.—pH values*

| Time in hours | 0 | 1 hr. | 2 hr. | 3 hr. | 4 hr. | 5 hr. | 6 hr. | 7 hr. |
|---|---|---|---|---|---|---|---|---|
| Test #1 | 6.2 | 5.9 | 5.6 | 5.5 | 5.5 | 5.5 | 5.5 | |
| Test #2 | 6.2 | 5.9 | | 5.6 | | 5.4 | | 5.4 |
| Test #3 | 6.3 | 5.7 | | 5.6 | | 5.4 | | 5.4 |

As shown by the above data the meat cuts at the end of a period of between 3 to 5 hours have substantially passed through rigor mortis.

The data presented in Table II represents the results obtained when a number of beef longissimus dorsi muscles were held at approximately 98° F. for a period of 4 hours and then placed in a chamber maintained at 36° F. In each of the tests control samples were taken from the same muscle of the beef carcass and without further treatment placed in the above chamber. Tenderness comparisons were then made between the test and control samples after holding and aging each for the specified periods.

*Table II*

| | | Initial Ave. Reading | 1 Day Rating | | | 3 to 4 Day Rating | | | 6 Day Rating | | |
|---|---|---|---|---|---|---|---|---|---|---|---|
| | | | Ave. | Diff. | Adv. for Test | Ave. | Diff. | Adv. for Test | Ave. | Diff. | Adv. for Test |
| Test #1 | C | 3.0 | 2.0 | −1.0 | | 2.5 | −0.5 | | 2.5 | −0.5 | |
| | T | 3.0 | 5.0 | +2.0 | +3.0 | 5.0 | +2.0 | +2.5 | 5.5 | +2.5 | +3.0 |
| Test #2 | C | 5.7 | 4.2 | −1.5 | | 6.0 | +0.3 | | 5.6 | −0.1 | |
| | T | 3.3 | 4.0 | +0.7 | +2.2 | 3.9 | +0.6 | +0.3 | 4.4 | +1.1 | +1.2 |
| Test #3 | C | 3.7 | 3.0 | −0.7 | | 4.5 | +0.8 | | 5.1 | +1.4 | |
| | T | 2.7 | 4.3 | +1.6 | +2.3 | 4.1 | +1.4 | +0.6 | 5.1 | +2.4 | +1.0 |
| Test #4 | C | 2.8 | 4.0 | +1.2 | | 6.0 | +3.2 | | 6.3 | +3.5 | |
| | T | 2.2 | 5.5 | +3.3 | +2.1 | 6.0 | +3.8 | +0.6 | 6.0 | +3.8 | +0.3 |
| Test #5 | C | 5.3 | 3.7 | −1.6 | | 6.6 | +1.3 | | 7.3 | +2.0 | |
| | T | 5.0 | 4.7 | −0.3 | +1.3 | 6.5 | +1.5 | +0.2 | 6.2 | +1.2 | −0.8 |
| Test #6 | C | 4.3 | 3.6 | −0.7 | | 6.2 | +1.9 | | 5.6 | +1.3 | |
| | T | 3.6 | 5.1 | +1.5 | +2.2 | 6.4 | +2.8 | +0.9 | 5.6 | +2.0 | +0.7 |

In Table II the tenderness of the cuts was rated on a scale of from 10 to 1 with 10 being excellent, 1 being extremely poor, and any rating above 5 being satisfactory. It will be observed that the improvement shown by the test samples over the control samples is the net difference in the ratings at the end of any given period over the original ratings.

The data shown in Table II indicate that there is generally an appreciable gain in tenderness of the treated samples over the control samples. This gain is especially marked in the early stages of the aging period and is of commercial significance since the effect obtained in the ordinary aging practice can be obtained several days earlier by using the present invention.

The temperatures and humidity specified herein may be obtained and maintained in any desired or suitable manner such as, for example, by steam injection, by brine, or water spray, etc.

As described the present invention has the advantage of shortening the required aging period by accelerating the process of rigor mortis without employing special equipment or apparatus and without causing objectionable color changes in the meat.

The term "animal carcass" as used in the claims is intended to include the whole animal body after slaughtering and parts thereof into which the body is commonly divided in commercial slaughter house operations.

Obviously, many modifications and variations of the invention, as hereinbefore set forth, may be made without departing from the spirit and scope thereof, and therefore only such limitations should be imposed as are indicated in the appended claims.

We claim:

1. A process of treating animal carcasses and cuts thereof to accelerate the rigor mortis transition period without causing any appreciable color changes in the carcasses and cuts thereof, which comprises placing a freshly slaughtered carcass in a treating zone maintained at a temperature approximately that of the normal body temperature of the animal before an appreciable amount of the normal body heat of the said animal has dissipated therefrom, maintaining the said carcass in the said zone at the said temperature for a period of at least between approximately 3 to 5 hours, and then chilling the treated product to normal holding and aging temperature.

2. A process of treating beef carcasses and cuts thereof to accelerate the rigor mortis transition period without causing any appreciable color change in the carcasses and cuts thereof, which comprises placing a freshly slaughtered carcass in a treating zone maintained at a temperature approximately that of the normal body temperature of the animal before an appreciable amount of the normal body heat of the said animal has dissipated therefrom, maintaining said carcass in the said zone at said temperature until the pH value of the carcasses is between approximately 5.4 and 5.8, and then chilling the treated product to normal holding and aging temperature.

3. A process of treating animal carcasses and cuts thereof, comprising placing a freshly slaughtered carcass in a humidified treating zone maintained at a temperature of about the normal body temperature of the animals for a period of at least between approximately 3 to 5 hours before an appreciable amount of the normal body heat of the said animal has dissipated, whereby rigor mortis is substantially completed, and then chilling the treated product.

4. A process of treating animal carcasses and cuts thereof, comprising placing a freshly slaughtered carcass in a treating zone maintained at a relative humidity of approximately 90 per cent and a temperature of from between 98 and 100° F. before any appreciable amount of the body heat of the said animal has dissipated therefrom, maintaining the said carcasses and cuts thereof in the said zone at the said temperature for a period of at least between approximately 3 to 5 hours whereby rigor mortis is substantially completed, and then chilling the treated product.

5. A process of treating beef carcasses and cuts thereof to accelerate the rigor mortis transition period and thereby shortening the aging period required for tenderizing said carcass without causing any appreciable color change in the said carcass and cuts thereof, which comprises: placing a freshly slaughtered beef carcass in a treating zone maintained at a temperature approximately 98° F. and a relative humidity of at least approximately 90 percent before an appreciable amount of the normal body heat of the carcass has dissipated therefrom; maintaining the said carcass in the said zone at the said temperature for a period of at least approximately 4 hours; and chilling the treated product to the normal holding and aging temperature.

6. A process for treating lamb carcasses and cuts thereof to accelerate the rigor mortis transition period and thereby shortening the aging period required for tenderizing said carcass without causing any appreciable color change in the said carcass and cuts thereof, which comprises: placing a freshly slaughtered lamb carcass in a treating zone maintained at a temperature approximately 100° F. and a relative humidity of at least approximately 90 percent before an appreciable amount of the normal body heat of the carcass has dissipated therefrom; maintaining the said carcass in the said zone at the said temperature for a period of at least approximately 4 hours; and chilling the treated product to the normal holding and aging temperature.

7. A process for treating veal carcasses and cuts thereof to accelerate the rigor mortis transition period and thereby shortening the aging period required for tenderizing said carcass without causing any appreciable color change in the said carcass and cuts thereof, which comprises: placing a freshly slaughtered veal carcass in a treating zone maintained at a temperature approximately 99° F. and a relative humidity of at least approximately 90 percent before an appreciable amount of the normal body heat of the carcass has dissipated therefrom; maintaining the said carcass in the said zone at the said temperature for a period of at least approximately 4 hours; and chilling the treated product to the normal holding and aging temperature.

HARRY L. ROSCHEN.
BERNARD J. ORTSCHEID.
JOHN M. RAMSBOTTOM.

REFERENCES CITED

The following references are of record in the file of this patent:

UNITED STATES PATENTS

| Number | Name | Date |
| --- | --- | --- |
| 2,169,081 | James | Aug. 8, 1939 |
| 2,388,891 | Williams et al. | Nov. 13, 1945 |
| 2,419,119 | Christensen | Apr. 15, 1947 |